United States Patent
Zakharov

(10) Patent No.: US 10,148,883 B2
(45) Date of Patent: Dec. 4, 2018

(54) METHOD AND PROGRAM FOR IMAGE-BASED STATUS RESOLUTION SERVICES

(71) Applicant: KYOCERA Document Solutions Inc., Osaka (JP)

(72) Inventor: Oleg Y. Zakharov, Walnut Creek, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 75 days.

(21) Appl. No.: 15/144,107

(22) Filed: May 2, 2016

(65) Prior Publication Data

US 2017/0318225 A1 Nov. 2, 2017

(51) Int. Cl.
- *H04N 5/225* (2006.01)
- *H04N 5/232* (2006.01)
- *H04L 29/06* (2006.01)
- *G06T 7/00* (2017.01)

(52) U.S. Cl.
CPC ....... *H04N 5/23293* (2013.01); *G06T 7/0042* (2013.01); *H04L 67/42* (2013.01); *G06T 2207/10008* (2013.01)

(58) Field of Classification Search
CPC ............ H04N 1/0048; H04N 1/00183; H04N 1/00477; G03B 17/18; G03B 17/20
See application file for complete search history.

(56) References Cited

U.S. PATENT DOCUMENTS

| | | | | |
|---|---|---|---|---|
| 7,397,500 | B2 * | 7/2008 | Yost | H04N 1/00183 348/208.1 |
| 2002/0118383 | A1 * | 8/2002 | Kamiya | G03G 15/55 358/1.13 |
| 2003/0202104 | A1 * | 10/2003 | Werner | H04N 1/00132 348/207.99 |
| 2003/0231241 | A1 * | 12/2003 | Iida | H04N 1/00127 348/207.99 |
| 2004/0208475 | A1 * | 10/2004 | Ohmura | H04N 1/00183 386/224 |
| 2004/0263662 | A1 * | 12/2004 | Okisu | H04N 1/0035 348/333.02 |

(Continued)

FOREIGN PATENT DOCUMENTS

| | | |
|---|---|---|
| JP | 2012-185265 | 9/2012 |
| JP | 2013-205425 | 10/2013 |

*Primary Examiner* — Twyler L Haskins
*Assistant Examiner* — Dwight Alex C Tejano
(74) *Attorney, Agent, or Firm* — Sheppard, Mullin, Richter & Hampton LLP

(57) ABSTRACT

A method and program product includes capturing at least one image of an operations display of at least one peripheral device. The operations display at least presents information associated with a status encountered by the at least one peripheral device. The at least one image is communicated to at least one computing system. The at least one computing system is at least configured for processing the at least one image for extracting features of the at least one peripheral device, determining a model of the at least one peripheral from the extracted features, determining at least a status encountered by the peripheral device from the extracted features, and creating a resolution to the encountered status. The resolution to the encountered status is received from the at least one computing system and displayed.

14 Claims, 13 Drawing Sheets

(56) References Cited

U.S. PATENT DOCUMENTS

| | | | | |
|---|---|---|---|---|
| 2007/0140678 A1* | 6/2007 | Yost | .................... | H04N 1/00183 |
| | | | | 396/147 |
| 2010/0315681 A1* | 12/2010 | Misawa | ............. | H04N 1/32144 |
| | | | | 358/1.15 |
| 2010/0325490 A1* | 12/2010 | Anvin | ................. | G06F 11/0748 |
| | | | | 714/37 |
| 2012/0140284 A1 | 6/2012 | Tashiro et al. | | |
| 2012/0199643 A1* | 8/2012 | Minnick | ........... | G06F 17/30879 |
| | | | | 235/375 |
| 2012/0219053 A1* | 8/2012 | Snow | ............... | H04N 19/00078 |
| | | | | 375/240.02 |
| 2012/0222081 A1* | 8/2012 | Schaefer | ................. | H04N 17/04 |
| | | | | 725/132 |
| 2012/0321131 A1* | 12/2012 | Kobayashi | ......... | H04N 1/00183 |
| | | | | 382/103 |
| 2013/0050507 A1* | 2/2013 | Syed | .................. | H04N 1/00137 |
| | | | | 348/207.1 |
| 2013/0166969 A1* | 6/2013 | Zhang | ................. | G06F 11/0772 |
| | | | | 714/57 |
| 2013/0169996 A1* | 7/2013 | McLeod | ................. | H04L 67/36 |
| | | | | 358/3.28 |
| 2014/0082430 A1* | 3/2014 | Bartlett | ............... | G06F 11/3055 |
| | | | | 714/47.3 |

\* cited by examiner

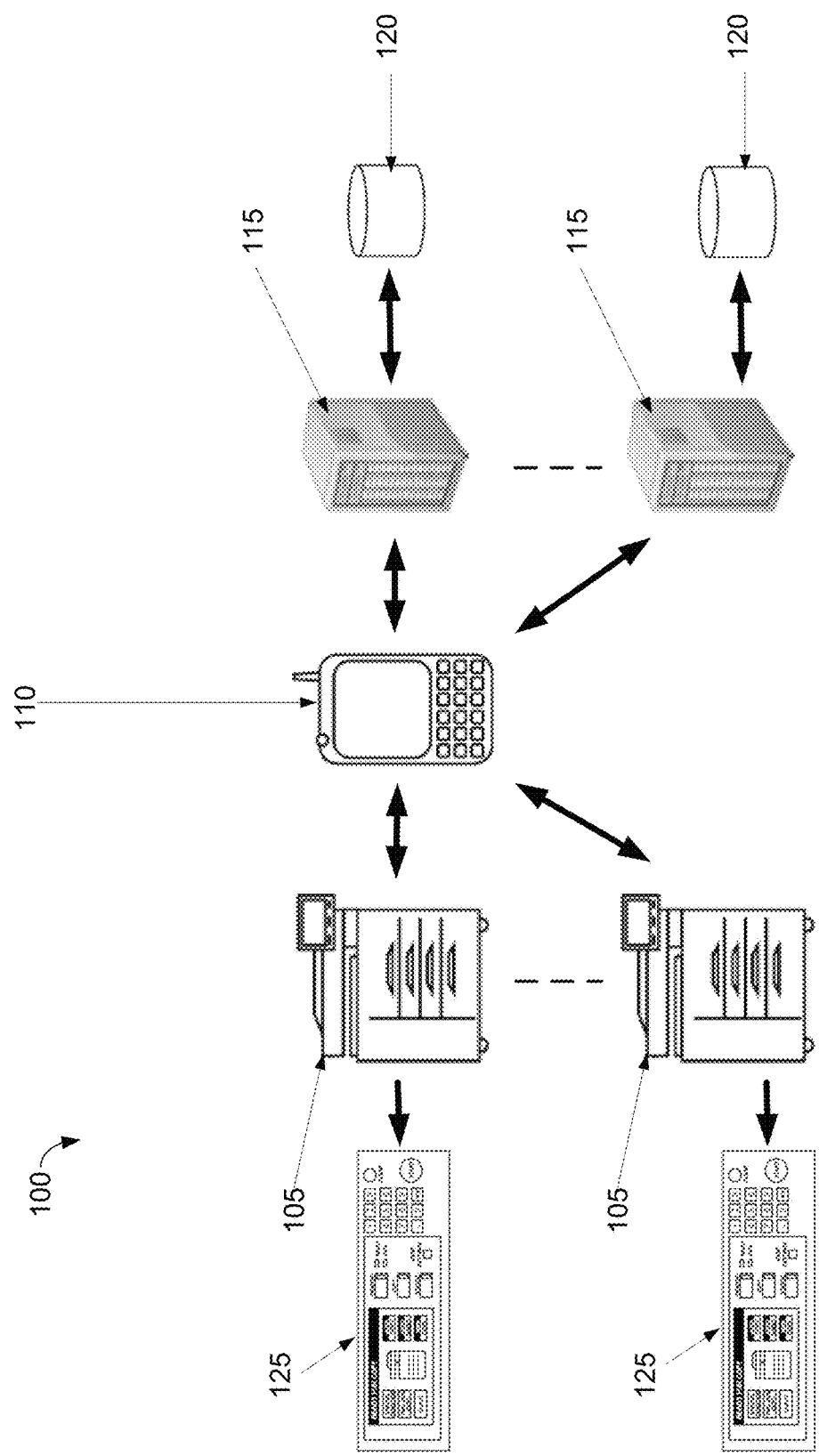

METHOD AND PROGRAM FOR IMAGE-BASED STATUS RESOLUTION SERVICES

CROSS-REFERENCE TO RELATED APPLICATIONS

Not applicable.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

FIELD OF THE INVENTION

One or more embodiments of the invention generally relate to automated support. More particularly, the invention relates to image-based status resolution services.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Electronic equipment typically may fail at some point during the lifetime of a device. Often the cause of failure may be resolved with specific procedures and/or actions. Certain electronic equipment may come equipped with user displays that may inform a user on the nature of a failure and/or provide steps to resolve a failure. There may be cases where a user may not have the necessary expertise, permissions, and/or knowledge to resolve a failure and may require additional support. A typical solution may include a user calling a device manufacturer's tech support and requesting aid. A user may also search a database, technical manuals, and/or the internet for failure resolutions. Generally, traditional solutions may require a user to dedicate a non-trivial amount of time to resolve a failure The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that some electronic devices may capture status or status data that is displayed to a user and forwarded to a manufacturer for failure support. Some electronic devices may also come equipped with imaging apparatuses that allow a user to take an image of an electronic device for failure detection and/or resolution.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A illustrates an exemplary system for providing image-based status resolution services, in accordance with an embodiment of the present invention;

Figure 1B:
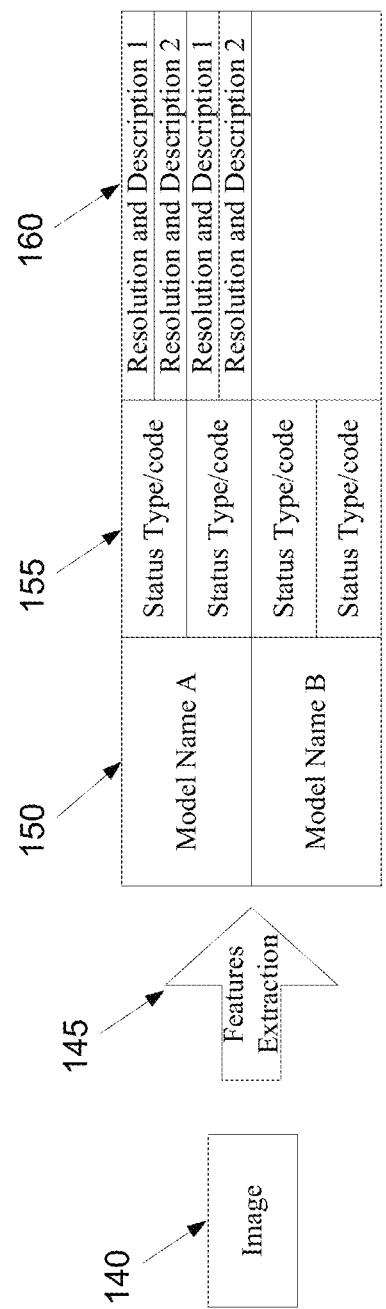
FIG. 1B illustrates an exemplary flow of an exemplary system for providing image-based status resolution services, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settle law, as early as 1939, that words of approximation are not indefinite in the claims even when such limits are not defined or specified in the specification.

For example, see *Ex parte Mallory*, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See *Energy Absorption Sys., Inc.* v. *Roadway Safety Servs., Inc.*, Civ. App. 96-1264, slip op. at 10 (Fed. Cir. Jul. 3, 1997) (unpublished) *Hybridtech* v. *Monoclonal Antibodies, Inc.*, 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See *Seattle Box Co.* v. *Industrial Crating & Packing, Inc.*, 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See *In re Frye*, Appeal No. 2009-006013, 94 USPQ2d 1072, 1077, 2010 WL 889747 (B.P.A.I. 2010) Depending on its usage, the word "substantially" can denote either language of approximation or language of magnitude. *Deering Precision Instruments, L.L.C.* v. *Vector Distribution Sys., Inc.*, 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognize in case law to have the dual ordinary meaning of connoting a term of approximation or a term of magnitude. See *Dana Corp.* v. *American Axle & Manufacturing, Inc.*, Civ. App. 04-1116, 2004 U.S. App. LEXIS 18265, *13-14 (Fed. Cir. Aug. 27, 2004) (unpublished). The term "substantially" is commonly used by claim drafters to indicate approximation. See *Cordis Corp.* v. *Medtronic AVE Inc.*, 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also *Deering Precision Instruments, LLC* v. *Vector Distribution Sys., Inc.*, 347 F.3d 1314, 1322 (Fed. Cir. 2003); *Epcon Gas Sys., Inc.* v. *Bauer Compressors, Inc.*, 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. See, for example, *Liquid Dynamics Corp.* v. *Vaughan Co.*, 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In *Cordis Corp.* v. *Medtronic AVE, Inc.*, 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In *Anchor Wall Systems* v. *Rockwood Retaining Walls, Inc.*, 340 F.3d 1298, 1311 (Fed. Cir. 2003)" Id. at 1311. Similarly, the plain language of Claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see *Deering Precision Instruments, L.L.C.* v. *Vector Distrib. Sys., Inc.*, 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see *Epcon*, 279 F.3d at 1031 ("The phrase 'substantially constant' denotes language of approximation, while the phrase 'substantially below' signifies language of magnitude, i.e., not insubstantial."). Also, see, e.g., *Epcon Gas Sys., Inc.* v. *Bauer Compressors, Inc.*, 279 F.3d 1022 (Fed. Cir. 2002) (construing the terms "substantially constant" and "substantially below"); *Zodiac Pool Care, Inc.* v. *Hoffinger Indus., Inc.*, 206 F.3d 1408 (Fed. Cir. 2000) (construing the term "substantially inward"); *York Prods., Inc.* v. *Cent. Tractor Farm & Family Ctr.*, 99 F.3d 1568 (Fed. Cir. 1996) (construing the term "substantially the entire height thereof"); *Tex. Instruments Inc.* v. *Cypress Semiconductor Corp.*, 90 F.3d 1558 (Fed. Cir. 1996) (construing the term "substantially in the common plane"). In conducting their analysis, the court instructed to begin with the ordinary meaning of the claim terms to one of ordinary skill in the art. *Prima Tek*, 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see *AK Steel Corp.* v. *Sollac*, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by *Pall Corp.* v. *Micron Separations, Inc.*, 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see *Verve LLC* v. *Crane Cams Inc.*, 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In *Andrew Corp.* v. *Gabriel Elecs. Inc.*, 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in *Ecolab Inc.* v. *Envirochem, Inc.*, 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see *Ecolab Inc.* v. *Envirochem Inc.*, 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter.", e.g., see *Pall Corp.* v. *Micron Seps.*, 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte *Mallory*, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re *Hutchison*, 104 F.2d 829, 42 USPQ 90, 93 (C.C.P.A. 1939) the court said "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment," "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" includes the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred or induced by any pattern(s) of description, embodiments, examples, or referenced prior-art that may (or may not) be provided in the present patent.

References to "end user", or any similar term, as used herein, is generally intended to mean late stage user(s) as opposed to early stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of, or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like. It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. .sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter. Moreover, for any claim of the present invention which claims an embodiment "consisting essentially of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising," "consisting of" and "consisting essentially of" where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, Firefox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; the non-transitory computer readable medium, however, does not include a pure transitory signal per se; i.e., where the medium itself is transitory.

Some embodiments of the present invention may provide means and/or methods for image-based status resolution services. Some of these embodiments may comprise computer software. In some of these embodiments, software may be integrated into hardware, including, without limitation, uniquely-designed hardware for running embodiment software.

Herein, the term 'status' is used to denote various kinds of undesirable operating conditions, which may include, without limitation, conditions of error, warning, important notifications (e.g., undesirable security settings against company policies), etc.

FIG. 1A illustrates an exemplary system for providing image-based status resolution services, in accordance with an embodiment of the present invention. Image-based status resolution system 100 comprises at least a multi-function peripheral 105, a smartphone 110, at least a server 115, and at least a database 120. A multi-function peripheral 105 further comprises of a display interface 125 that may display a multi-function peripheral 105's graphical user interface, status information, and/or status information. A smartphone 110 may be virtually any device or devices capable of capturing an image of multi-function peripheral 105 and/or display interface 125, as well as sending the image to a server 115. Server 115 may be any computing platform that executes computer software and/or code from a non-transitory computer readable medium. Server 115 may also access a database 120 containing status and status resolutions. In some embodiments, system 100 may comprise two or more multi-functional peripherals 105, two or more servers 115 with databases 120. In some embodiments, smartphone 110 may communicate one or more images to two or more servers 115. In a non-limiting example, smartphone 110 may communicate one or more images to multiple servers 115 and polls the servers 115 to determine which server may respond with status resolutions. In some embodiments, smartphone 110 may capture images from two or more multi-function peripherals 105 and communicate the images to one or more servers 115. In some alternate embodiments, smartphone 110 may capture images from a plurality of multi-function peripherals 105 and communicate the images in a batch mode. In other alternate embodiments, smartphone 110 may capture images from a plurality of multi-function peripherals 105 and communicate the images in a serial mode. As a non-limiting example, smartphone 110, may communicate the images as soon as they are captured. In some alternate embodiments, peripherals 105 may be single function devices. As a non-limiting example a peripheral may be a printer, scanner, lab device, measurement device, etc.

During typical operation, when a multi-function peripheral 105 encounters a status, a status message may be displayed on a display interface 125. A user of a smartphone 110 may capture an image of the display interface 125 and/or of multi-function peripheral 105 and send the image to server 115. Server 115 may receive the image and execute computer code and/or algorithms from a non-transitory computer readable medium to recognize features from the image. Information from recognized features may be, but not limited to, a multi-function peripheral 105 model number, a status message, one or more physical components of multi-function peripheral 105, panel message status code and text, check is some light flash, statistical/graphical information such as, without limitation, buttons and switches, and dynamical information such as, without limitation, flashing lights numerical codes, and texts including different languages. Server 115 may access database 120 and search for any resolutions to one or more status determined from the image. Resolutions may be retrieved from database 120 and sent to the user's smartphone 110. Smartphone 110 may format the resolutions for the user to view. The user may implement one or more resolutions to correct the one or more status determined for multi-function peripheral 105. In some alternate embodiments, smartphone 110 may capture an image of the display interface 125 and/or of multi-function peripheral 105 and send the image to a remote storage device such as, without limitation, a cloud storage system, not shown, where server 115 may retrieve the images. In this embodiment, server 115 may return the resolutions to the remote storage system where smartphone 110 may retrieve them. In some other alternated embodiments, the user may also include text along with the images. As a non-limiting example, a user may provide a description of how or when a status occurred.

In some embodiments, server 115 may include a maintenance working server. In some embodiments, if some defects are found or/and maintenance work needs to be scheduled a status report may be generated automatically based on the information extracted from the submitted image. In some embodiments, the status report may be used by the maintenance working server 115 to schedule a visit by a maintenance worker.

It may be appreciated by a person with ordinary skill in the art, in light of and in accordance with the teachings of the present invention, a multi-function peripheral 105 may be virtually any electronic device capable of having a display interface 125. Multi-function peripheral 105 may be, but not limited to, printers, copiers, computers, etc. In another embodiment of the present invention, multi-function peripheral 105 may be a combination printer and copier device.

It may be appreciated by a person with ordinary skill in the art, in light of and in accordance with the teachings of the present invention, multi-function peripheral 105 may connect to any number of devices with virtually any wired and/or wireless means. Multi-function peripheral may connect to virtually any device by means such as, but not limited to, Bluetooth connection, Ethernet cable, USB cable, WIFI, IRDA, etc. In an alternative embodiment of the present invention, a multi-function peripheral may send additional device and/or status data to a server and/or smartphone device via a cellular connection. In some embodiments, multi-function peripheral 105 may not be connected to any network and a user of smartphone 110 may capture an image of the display interface 125 and/or of multi-function peripheral 105 and send the image to server 115.

It may be appreciated by a person with ordinary skill in the art, in light of and in accordance with the teachings of the present invention, a smartphone 110 may be any device capable of capturing an image. Smartphone 110 may be devices such as, but not limited to, digital cameras, web cameras, video cameras, etc. In another embodiment of the present invention, smartphone 110 may be an integrated web camera on a personal computer, tablet or laptop.

It may be appreciated by a person with ordinary skill in the art, in light of and in accordance with the teachings of the present invention, a server 115 may be virtually any computing platform such as, but not limited to, a computer cluster, a laptop, a tablet, a smartphone, etc. In another embodiment of the present invention, server 115 may be a computer connected to smartphone 110 via a USB cable.

It may be appreciated by a person with ordinary skill in the art, in light of and in accordance with the teachings of the present invention, a database 120 may be virtually any data storage device or devices. Database 120 may be, but not limited to, a plurality of data servers, a memory card. In another embodiment of the present invention, database 120 may be a memory card connected to server 115.

It may be appreciated by a person with ordinary skill in the art, in light of and in accordance with the teachings of the present invention, that database 120 may contain virtually any data to improve the functionality of image-based status resolution system 100. Database 120 may include, without limitation, status tables, resolution libraries, multi-function peripheral device lists, and image databanks. In another embodiment of the present invention, database 120 may contain a table storing one or more multi-function peripheral model identifiers, peripheral images, peripheral status metadata, and resolutions and/or resolution steps.

It may be appreciated by a person with ordinary skill in the art, in light of and in accordance with the teachings of the present invention, image-based status resolution system 100 may be partially or completely contained in a local computing platform and/or network. In an alternative embodiment of the present invention, image-based status resolution system 100 may be located on a local computer network.

FIG. 1B illustrates an exemplary flow of an exemplary system for providing image-based problem resolution services, in accordance with an embodiment of the present invention. In the present embodiment, one or more images 140 captured by smartphone 110 of one or more peripherals 105 may be sent to one or more servers 115 where a feature extraction 145 may be performed. In a non-limiting example, feature extraction may employ, without limitation, image recognition algorithms and optical character recognition to identify information such as, but not limited to, shapes, colors, alphanumerical information, lights, etc. Server 115 may apply search criteria to database 120 to identify, but not limited to, a peripheral 105's model name 150, status and/or status code 155 and one or more possible resolutions 160. In some alternate embodiments, server 115 may also employ a user's supplied status description in determining possible resolutions 160.

Figure 2:
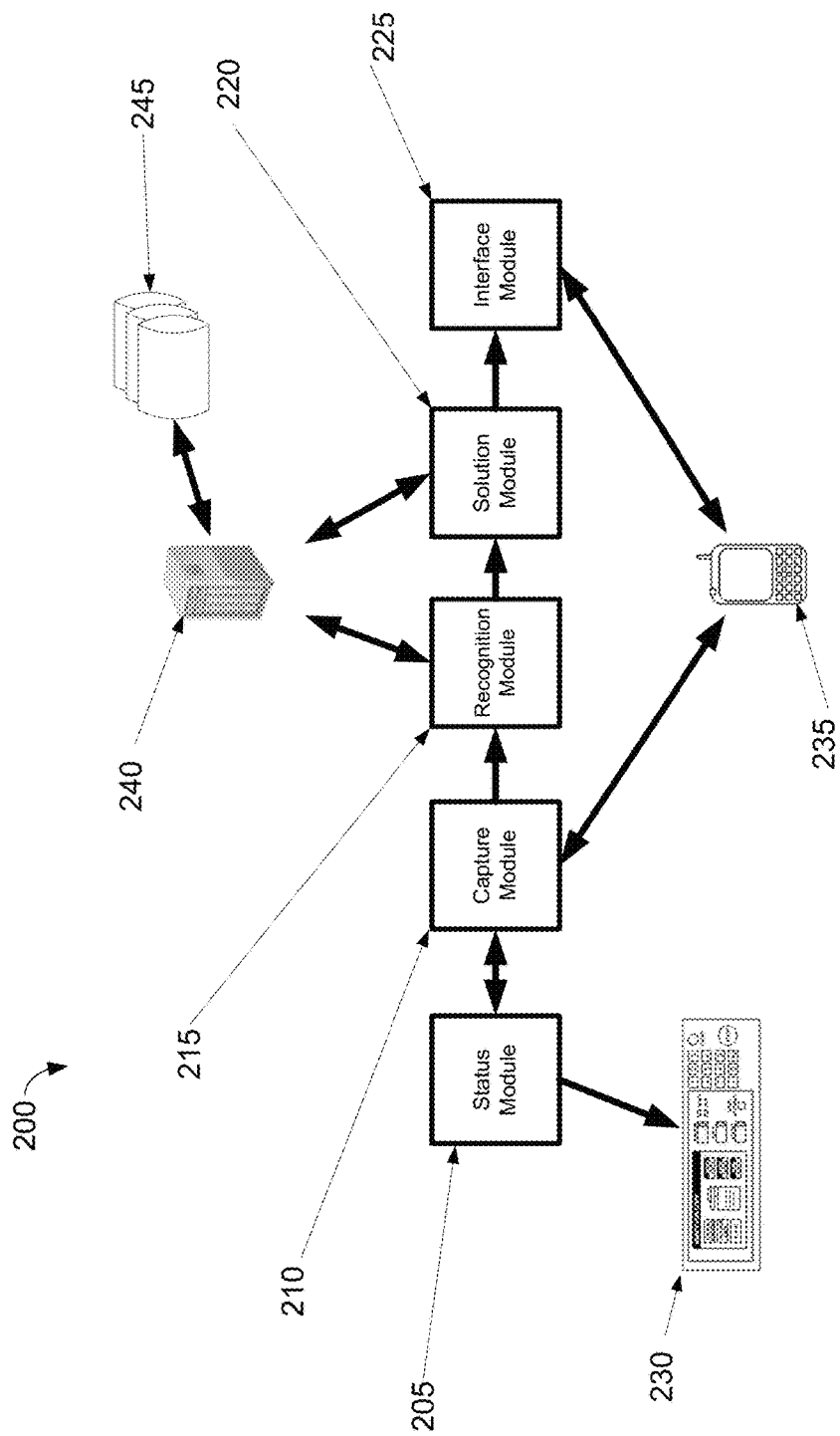
FIG. 2 illustrates an architecture of an exemplary system for providing image-based status resolution services, in accordance with an embodiment of the present invention.

FIG. 2 illustrates an architecture of an exemplary system for providing image-based status resolution services, in accordance with an embodiment of the present invention. An image-based status resolution architecture 200 may comprise a status module 205, a capture module 210, a recognition module 215, a solution module 220, and an interface module 225. Status module 205 may have a means of detecting a status on a multi-function peripheral, such as, without limitation, sensors and/or a processing unit, and displaying a status message on a display 230. Capture module 210 may have a means of capturing an image, such as, without limitation, a smartphone 235 or virtually any camera, of display 230 and/or a multi-function peripheral. Recognition module 215 may have a means of processing an image such as, without limitation, a processing unit, a computer, or a server 240 to execute computer code and/or algorithms from a non-transitory computer readable medium for image recognition. Solution module 220 may have a processing means such as, without limitation, a processing unit, a computer, or a server 240 to execute computer code and/or algorithms from a non-transitory computer readable medium for determining and resolving a status. Both recognition module 215 and solution module 220 may access one or more databases 245 as part of executing computer code and/or algorithms to, respectively, recognize an image or resolve a status. An interface module 225 may have a means to display resolution information, such as, without limitation, a screen on a smartphone 235, to a user.

During typical operation, a status module 205 may detect a status on a multi-function peripheral and display a status message on display 230. A user may take a picture of display 230 and/or multi-function peripheral with a smartphone 235. Capture module 210 may take the one or more captured images and send the captured images to a recognition module 215. The recognition module 215 receives the captured images and may execute image recognition algorithms on a computing platform, such as, without limitation, server 240, to detect status data. Status data may include, without limitation, a physical defect, a multi-function peripheral model identification number, a status code, flashing lights, etc. The detected status data may be sent to a solution module 220 which has a processing means, such as, without limitation, server 240, to determine a specific status from the status data. Solution module 220 may then determine a resolution to a detected status and/or may access a database 245 with for a resolution from a training data set. One or more status resolutions may be sent to an interface module which has means to display, such as, without limitation, a smartphone 235, resolutions to a user.

It may be appreciated by a person with ordinary skill in the art, in light of and in accordance with the teachings of the present invention, that one or more modules may be embodied in a single device. In an alternative embodiment of the present invention, all modules except the status module may be embodied in a server device and/or smartphone device which would be capable of taking a picture, determining and resolving a status, and providing a problem resolution to a user.

It may be appreciated by a person with ordinary skill in the art, in light of and in accordance with the teachings of the present invention, that virtually any algorithm and/or computer code may be used to recognize an image on recognition module 215. Image recognition algorithms and/or methods may include, without limitation, Bayesian networks, fuzzy logic, neural networks, template matching, Hidden Markov models, machine learning, data mining, feature extraction and data analysis/statistics, optical character recognition, etc. In an alternative embodiment of the present invention, a binary search tree may be implemented to extra data from an image.

It may be appreciated by a person with ordinary skill in the art, in light of and in accordance with the teachings of the present invention, that there may be a plurality of the same modules in the image-based status resolution architecture 200. A plurality of modules such as, without limitation, capture module 210, recognition module 215, and/or solution module 220 may be present in image-based status resolution architecture 200. The plurality of similar modules may work in parallel or independently to improve the throughput and/or speed of image-based status resolution architecture 200. In an alternative embodiment of the present invention, a plurality of recognition and/or solution modules may be connected to an image-based status resolution system via wired and wireless connections to access resources from different wired and wireless networks. In still another alternative embodiment of the present invention, a plurality of similar modules may form a secondary image-based status resolution system capable of seamlessly substituting a messing and/or failing module.

It may be appreciated by a person with ordinary skill in the art, in light of and in accordance with the teachings of the present invention, that one or more modules may transmit multi-function peripheral and/or status information to a tech support server that is on an accessible network or over the internet. In an alternative embodiment of the present invention, additional multi-function peripheral and/or status information may be sent to a server to alleviate processing load on an image-based status correction system.

It may be appreciated by a person with ordinary skill in the art, in light of and in accordance with the teachings of the present invention, that any module in image-based status resolution architecture 200 may perform data manipulation. Data manipulation such as, but not limited to, compression, encryption, formatting. In an alternative embodiment of the present invention, any module sending data may first compress the data prior to data transmission.

Figure 3A:
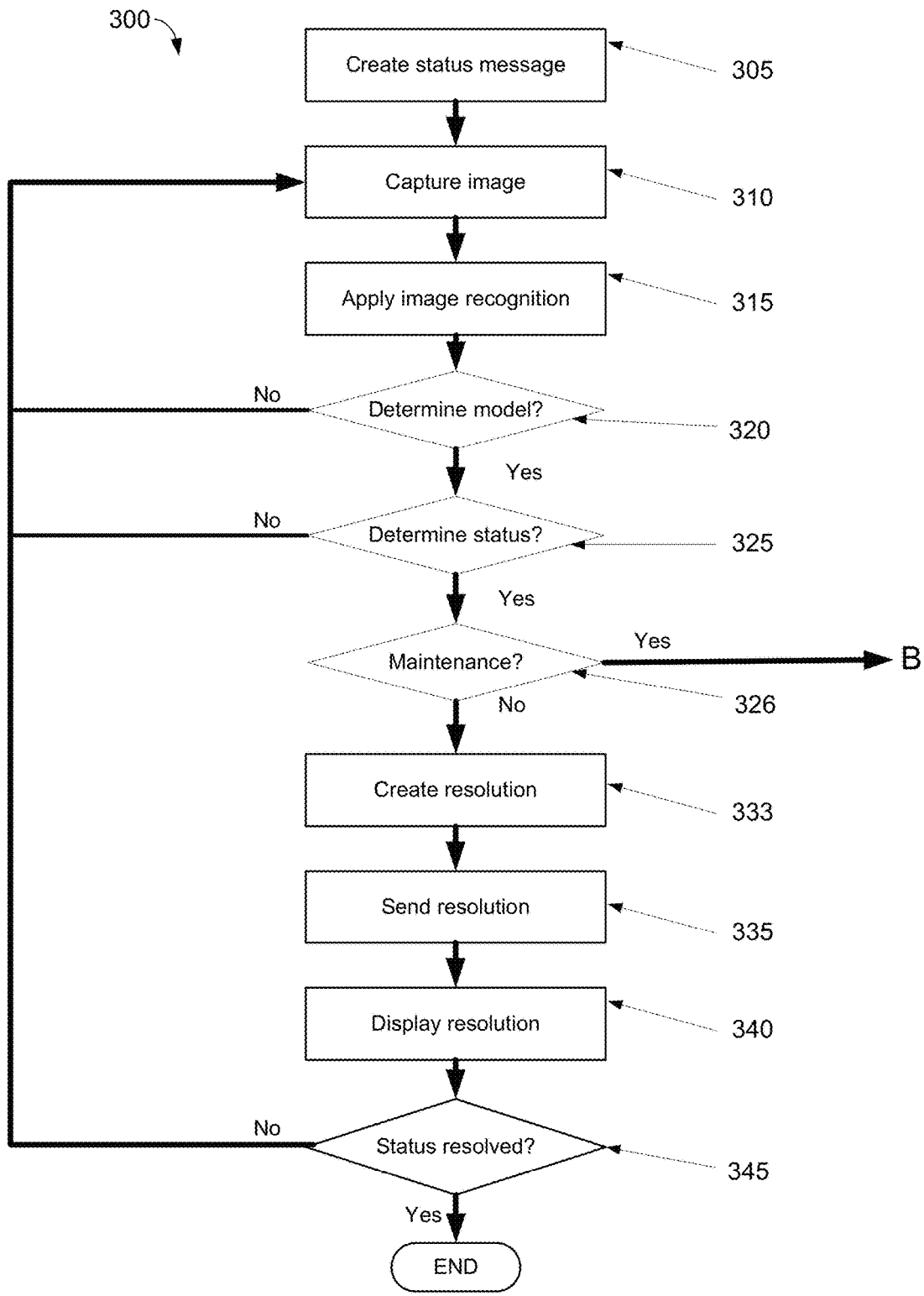
FIGS. 3A and 3B are flow charts illustrating an exemplary process for generating status messages on a status module, in accordance with an embodiment of the present invention.
Figure 3B:
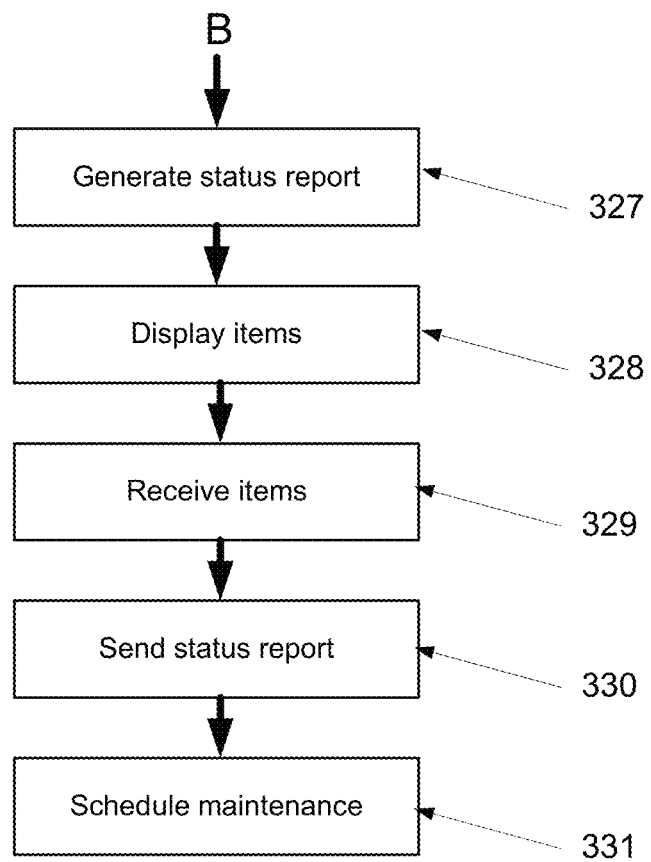

FIGS. 3A and 3B are flow charts illustrating an exemplary process for image-based status resolution, in accordance with an embodiment of the present invention. An image-based status resolution process 300 begins with a create status message step 305 where a status message is created in response to a status being detected on a multi-function peripheral. A user may capture and submit an image of the status message and/or multi-function peripheral in a capture image step 310. Image recognition algorithms may be applied to the captured image in an apply image recognition step 315. Information may be extracted from the captured image such as, but not limited to, physical defects, status codes, alpha numerical message of current status and instructions to user such as, without limitation, "System status. Reboot the device", graphical presentation of device's parts, etc. A multi-function peripheral model number may be determined from the extracted information in a determine model step 320. If the model was not determined, the user may be prompted to take another image in step 310. A specific status may be determined from the extracted information in a determine status step 325. If a status was not determined, the user may be prompted to take another image in step 310. In a step 326, if the determined status indicates a maintenance may be required, a status report is generated in a step 327. One or more items from the status report may be displayed in a step 328. In a step 329 the user may select one or more of the items. The selected items may then be included in the status report and sent to maintenance working server 115 in a step 330. Maintenance working server 115 may then schedule a maintenance in a step 330. In some embodiments, maintenance working server 115 may schedule a visit by a maintenance worker in a step 331. In other embodiments, maintenance working server 115 may schedule a communication between the user and the maintenance worker. If a maintenance is not determined, resolutions for the determined status may be created with a processing means executing computer code from a non-transitory computer readable medium in a create resolution step 333. Status resolutions may also be searched from a database and one or more resolutions may be retrieved from the database. The one or more resolutions may be sent to a user interface device in a send resolution step 335. Information from one or more resolutions may be formatted and displayed to a user on the user interface device in a display resolution step 340.

At a status check step 345, a user may check to see if the status on the multi-function peripheral is resolved. If the status is not resolved, then the user may return to capture image step 310. In some embodiments, if the model was correctly identified, step 320 may be skipped.

In some embodiments, the user may return to, for example, capture image step 310 if the status is determined not resolved at the status check step 345, as described above. In some other embodiments, when the status is not resolved, status module 205 may determine a maintenance work is required to the printing device and the captured image and/or recaptured image may be sent to a maintenance working server. In some embodiments, maintenance working server 115 may request the user to send a status report. In some embodiments, the status report may be automatically created or the user may create and send the status report. In some embodiments, the status report may include information extracted from the captured image. In some other embodiments, the user may be asked items to be included in the status report, such as, without limitation, value of counters, toner level, etc. In a non-limiting example, the status report may be used to diagnose a current state of a printing device. In some embodiments, the status report may be used to schedule a visit of the maintenance worker. In some other embodiments, the user may try to resolve the status with help from communicating to the maintenance worker remotely located, for example, without limitation, over a phone. In some embodiments, in some cases where the printing device may be accessed remotely, the maintenance worker may directly access the printing device to resolve the status. In some embodiments, depending on the status, the status may be resolved after the maintenance worker visits the printing device.

In some yet other embodiments, the user may be prompted to take a video streaming in addition to or instead of taking a picture, which may be used to recognize model name/brand name of the printing device, so that status of the printing device may be specified. In a non-limiting example, in some cases some LED lights may flash or multiple images may be displayed one by one on the operation panel. In a non-limiting example, if a paper jam takes place, the operation panel displays guidance to fix in a movie. In these cases, taking a video streaming and communicating it to the server may work well to recognize the status of the printing device.

It may be appreciated by a person with ordinary skill in the art, in light of and in accordance with the teachings of the present invention, that virtually any additional steps may be added to status resolution process 300. Additional steps may include, but not limited to, additional data gathering, sending messages to other devices, and accessing additional resources. In an alternative embodiment of the present invention, status resolution process 300 may include steps for automated calling of support services for certain status. In yet another alternative embodiment of the present invention, status resolution process 300 may include suggesting recommended resolutions to a user before and/or after a user captures an image. In still another alternative embodiment of the present invention, status resolution process 300 may send emails, upload data, and/or send text messages containing more detailed information regarding a multi-function peripheral and/or a status.

It may be appreciated by a person with ordinary skill in the art, in light of and in accordance with the teachings of the present invention, that one or more steps in the image-based status resolution process 300 may be added, removed, or rearranged. In some embodiments of the present invention, image-based status resolution process 300 may omit the steps of. In other embodiments of the present invention, the order of steps in the image-based status resolution process 300 may occur in any order. In still other embodiments of the present invention, additional steps may be added to the image-based status resolution process 300. In another embodiment, the user may recognize general/broad information on a status in step 305. The user may enter status identification information, for example, status code on the operation panel in a smartphone in step 310. The user may be prompted to take a picture of the operation panel in step 310 to retrieve more information, such as, without limitation, a flashing LED.

Figure 4:
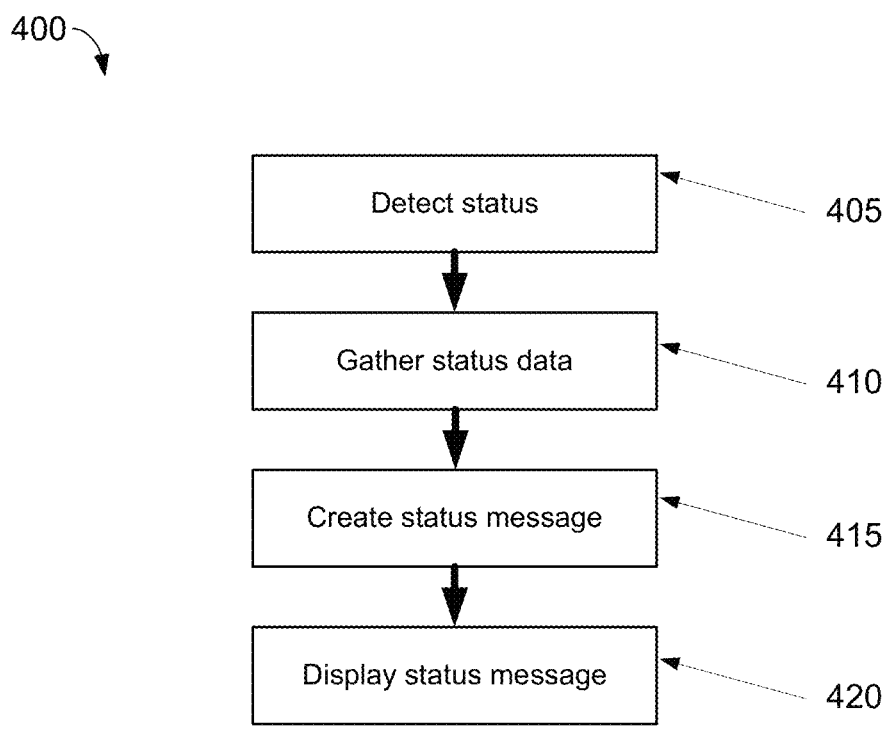
FIG. 4 is a flow chart illustrating an exemplary process for image capture on a capture module, in accordance with an embodiment of the present invention.

FIG. 4 is a flow chart illustrating an exemplary process for generating status messages on a status module, in accordance with an embodiment of the present invention. A status generation process 400 begins with a detect status step 405. If a status is detected on a multi-function peripheral, status data may be gathered in a gather status data step 410. A status message is created in a create status message step 415 and displayed in a display status message step 420.

It may be appreciated by a person with ordinary skill in the art, in light of and in accordance with the teachings of the present invention, that virtually any data may be displayed in display status message step 420. Data such as, but not limited to, multi-function peripheral device status, multi-function peripheral sensor readings, alphanumerical information about status, instructions how to proceed with such status such as, without limitation, "System problem, reboot the devices" and graphical information of the device or its parts. In another embodiment of the present invention, one or more components of a multi-function peripheral may have a status displayed in a status message.

It may be appreciated by a person with ordinary skill in the art, in light of and in accordance with the teachings of the present invention, that virtually any form of status message may be created in create status message step 415. Status messages may be, without limitation, an encoded image, a barcode, an internet link, graphical presentation of the device, device's parts, and help information. In an alternative embodiment of the present invention, a status message may be a QR image with encoded status-relevant data.

It may be appreciated by a person with ordinary skill in the art, in light of and in accordance with the teachings of the present invention, status messages displayed in display status message step 420 do not necessarily need to be static images. Status messages may be, but not limited to, a series of images, a video. In an alternative embodiment of the present invention, a status message may be a series of images containing different status metadata. In still another alternative embodiment of the present invention, a status message may be a video.

It may be appreciated by a person with ordinary skill in the art, in light of and in accordance with the teachings of the present invention, that one or more steps in the status generation process 400 may be added, removed, or rearranged. In still other alternate embodiments of the present invention, additional steps such as, but not limited to sending detailed status information to an external device may be added to the status generation process 400.

Figure 5:
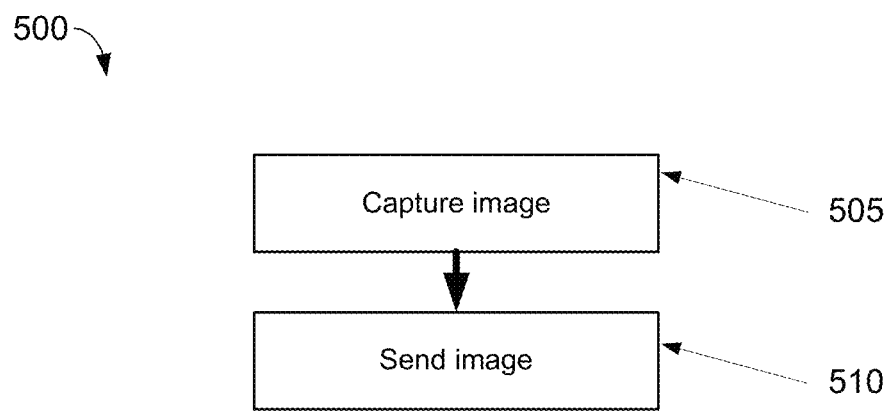
FIG. 5 is a flow chart illustrating an exemplary process for image recognition on a recognition module, in accordance with an embodiment of the present invention.

FIG. 5 is a flow chart illustrating an exemplary process for image capture on a capture module, in accordance with an embodiment of the present invention. An image capture process 500 begins with a capture image step 505. A user may use an image capture device such as, but not limited to, a camera to capture an image of a multi-function peripheral and/or a status message on a display. The captured image may then be sent to a recognition module in a send image step 510 for determining the nature of a status.

It may be appreciated by a person with ordinary skill in the art, in light of and in accordance with the teachings of the present invention, that virtually any image may be captured in capture image step 505. Images may be, without limitation, mono-chrome, infrared, a series of sequential images, video, etc. In an alternative embodiment of the present invention, a stereoscopic image may be taken of a multi-function peripheral to provide a three dimensional image. In still another alternative embodiment of the present invention, a video may be taken of a multi-function peripheral.

It may be appreciated by a person with ordinary skill in the art, in light of and in accordance with the teachings of the present invention, that one or more steps in the capture image process 500 may be added, removed, or rearranged.

Figure 6:
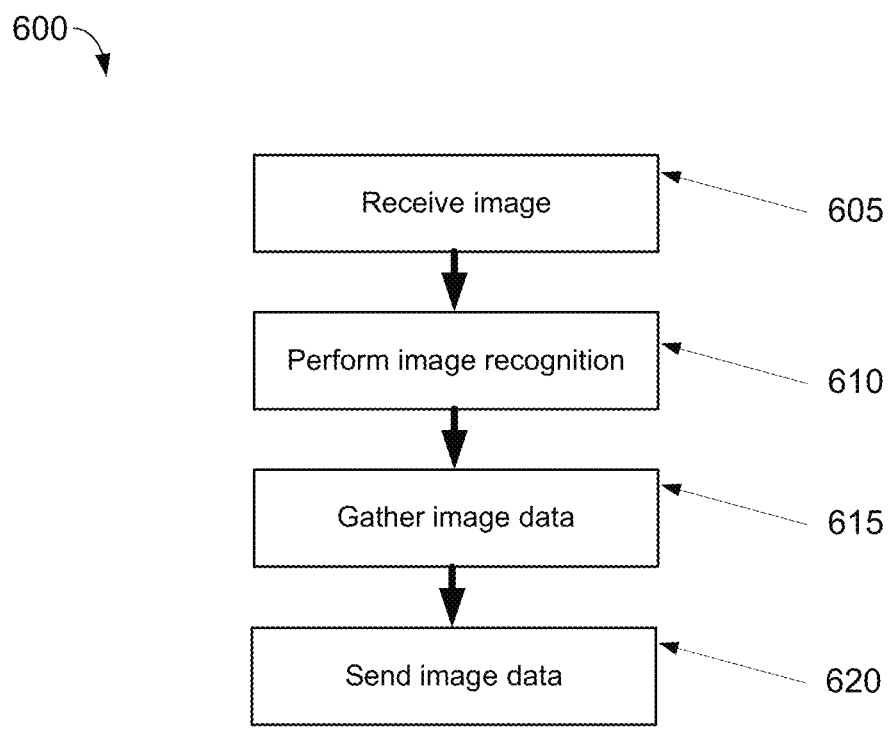
FIG. 6 is a flow chart illustrating an exemplary process for retrieving course data in a course module, in accordance with an embodiment of the present invention.

FIG. 6 is a flow chart illustrating an exemplary process for image recognition on a recognition module, in accordance with an embodiment of the present invention. An image recognition process 600 begins with a receive image step 605 where a captured image is received by a recognition module. The received image may be processed by processing means such as, without limitation, a computer processor. Computer code and/or algorithms stored on a non-transitory computer readable medium are executed and image data is extracted from an image in a perform image recognition step 610. Image data may include, without limitation, recognized text and/or symbols, physical changes, sensor metadata. The extracted data is gathered in a gather image data step 615 and may be further processed by executing computer code and/or algorithms for purposes such as, but not limited to, data compression, data calibration. The gathered image data may be sent to a solution module in a send image data step 620.

It may be appreciated by a person with ordinary skill in the art, in light of and in accordance with the teachings of the present invention, that one or more steps in the image recognition process 600 may be added, removed, or rearranged.

Figure 7:
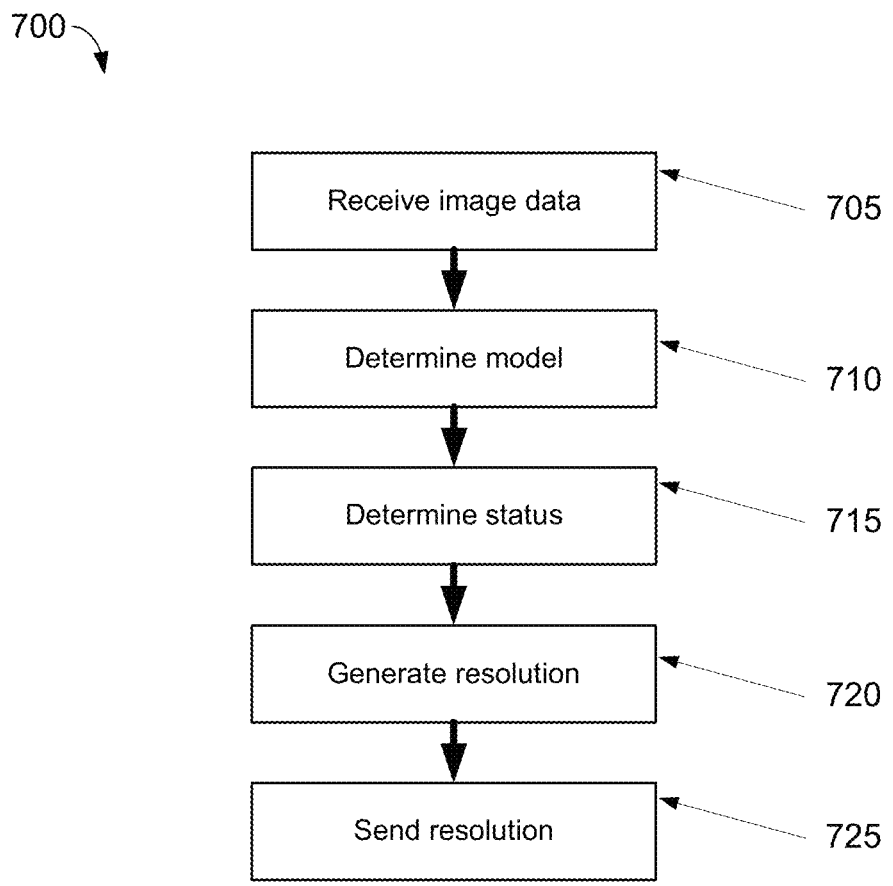
FIG. 7 is a flow chart illustrating an exemplary process for resolving a status on a solution module, in accordance with an embodiment of the present invention.

FIG. 7 is a flow chart illustrating an exemplary process for resolving a status on a solution module, in accordance with an embodiment of the present invention. A status resolution process 700 begins with a receive image data step 705 where a solution module receives data extracted from an image. A determine model step 710 determines a specific model of multi-function peripheral from the received image data. A determine status step 715 determines one or more status associated with a multi-function peripheral model and/or status data determined from the received image data. One or more resolutions are generated in a generate resolution step 720. The one or more resolutions are sent to an interface module in a send resolution step 725. In some embodiments, if a model may not be identified in step 710, a user may be prompted to recapture one or more images. In some embodiments, if a status may not be identified in step 715, a user may be prompted to recapture one or more images.

It may be appreciated by a person with ordinary skill in the art, in light of and in accordance with the teachings of the present invention, that one or more steps in the status resolution process 700 may be added, removed, or rearranged.

Figure 8:
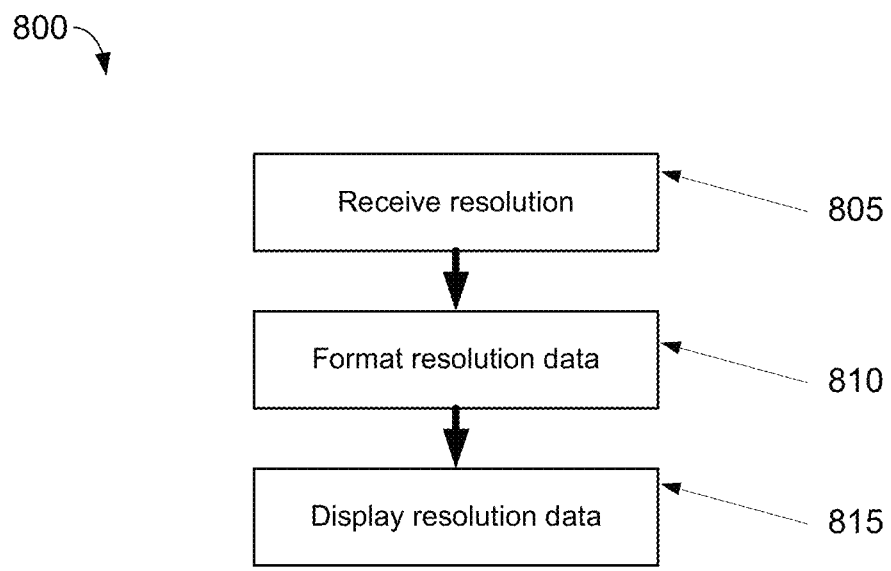
FIG. 8 is a flow chart illustrating an exemplary process for displaying resolutions on an interface module, in accordance with an embodiment of the present invention.

FIG. 8 is a flowchart illustrating an exemplary process for displaying resolutions on an interface module, in accordance with an embodiment of the present invention. A display resolutions process 800 begins with a receive resolutions step 805. During receive resolutions step 805, an interface module receives data associated with the execution results of a computer code and/or software running on a solutions module such as, but not limited to, status resolutions, device diagnostics, resolution recommendations, etc. The received resolutions are formatted in a format resolution data step 810, wherein the data is converted, by a processing means such as a processor, for specific user interfaces such as, but not limited to, screens, speakers. A display resolution data step 815 presents the formatted data to a user through presentation means such as, but not limited to, screens, speakers, etc.

It may be appreciated by a person with ordinary skill in the art, in light of and in accordance with the teachings of the present invention, that format resolution data step 810 may format resolution data intended for a user for virtually any device. Format resolution data step 810 may format resolution data for devices such as, but not limited to, smartphones, computer monitors, televisions, stereoscopic displays, listening devices, etc. In an alternative embodiment of the present invention, resolution data intended for a user may be converted to a sound file and audibly played to a user. In alternative embodiments, resolution data may be formatted for interaction with the user. As a non-limiting example, the user may interact with the display to send feedback to the server indicating success of the resolution data.

It may be appreciated by a person with ordinary skill in the art, in light of and in accordance with the teachings of the present invention, that one or more steps in the display resolutions process 800 may be added, removed, or rearranged.

Figure 9:
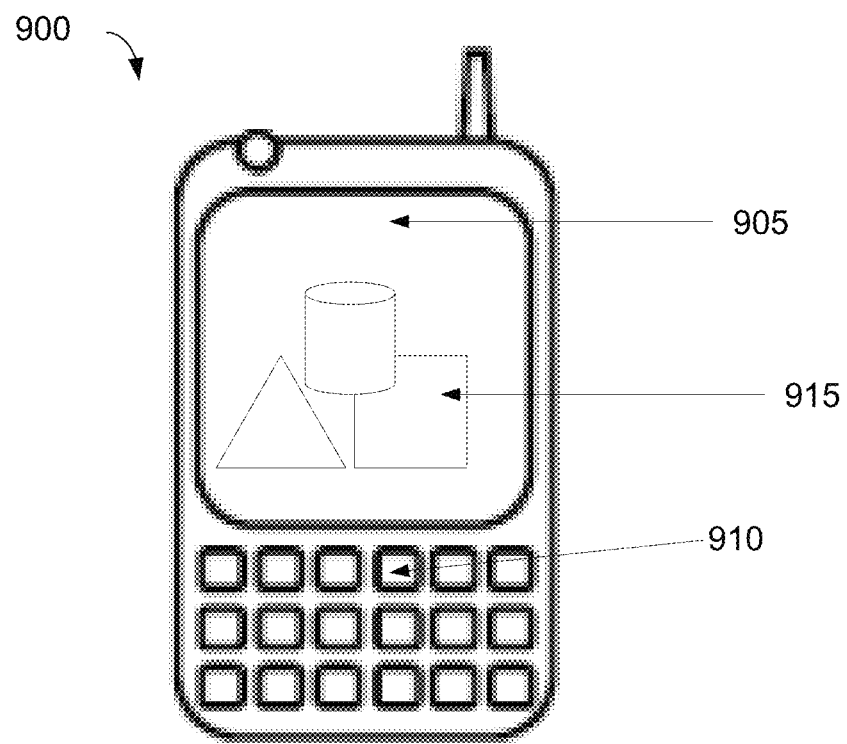
FIG. 9 illustrates an exemplary user interface for user interaction, in accordance with an embodiment of the present invention.

FIG. 9 illustrates an exemplary user interface for user interaction, in accordance with an embodiment of the present invention. A user interface device 900 comprises of a display 905 and a user input means 910. A display 905 may be virtually any means of delivering information to a user such as, but not limited to, a touchscreen display, a speaker, e-paper. A display 905 may also include a graphical user interface 915 which may allow a user to navigate through steps in an image-based status resolution process and/or perform additional functions. A graphical user interface 915 may be virtually any kind of interface that a user may interact with via a user input means 910. User input means 910 may be virtually any hardware capable of receiving user input such as, but not limited to, a touchscreen, a keypad, a mouse, a keyboard, etc.

It may be appreciated by a person with ordinary skill in the art, in light of and in accordance with the teachings of the present invention, that one or more elements of user interface device 900 may be comprised of one or more individual devices. In another embodiment of the present invention, all the elements of user interface device 900 may be embodied in a single smartphone device. In still another embodiment of the present invention, a user input means 910 may be a separate hardware device from a display 905.

It may be appreciated by a person with ordinary skill in the art, in light of and in accordance with the teachings of the present invention, that graphical user interface 915 may be formatted based on user interface device 900. Graphical user interface 915 may be formatted to meet a specific user interface device 900's hardware specifications such as, without limitation, a display resolution, a processing speed, an amount of available RAM, etc. In another embodiment of the present invention, graphical user interface 915 may be virtually any resolution to accommodate a user interface device 900's display specifications.

Figure 10:
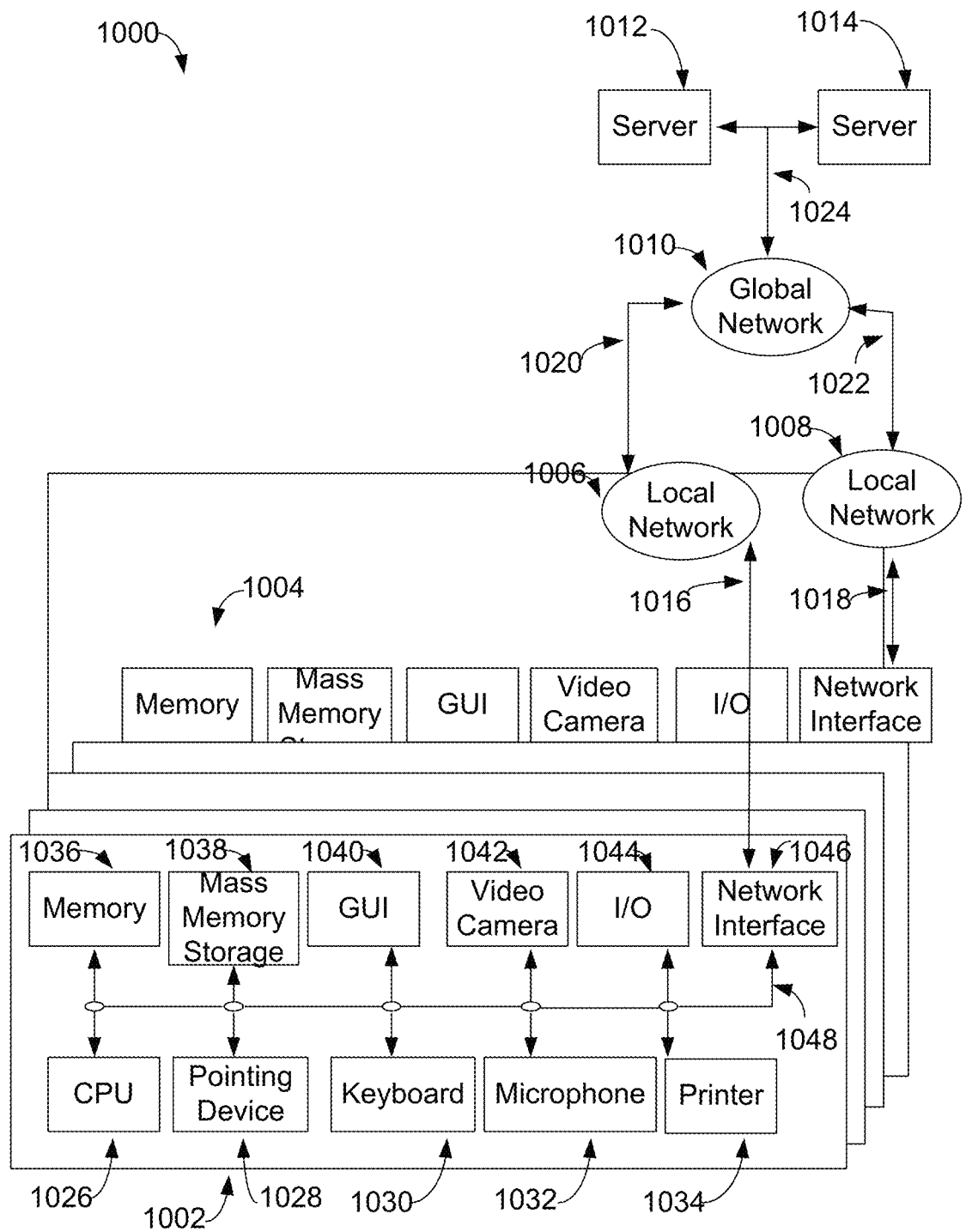
FIG. 10 is a block diagram depicting an exemplary client/server system which may be used by an exemplary web-enabled/networked embodiment of the present invention.

FIG. 10 is a block diagram depicting an exemplary client/server system which may be used by an exemplary web-enabled/networked embodiment of the present invention.

A communication system 1000 includes a multiplicity of clients with a sampling of clients denoted as a client 1002 and a client 1004, a multiplicity of local networks with a sampling of networks denoted as a local network 1006 and a local network 1008, a global network 1010 and a multiplicity of servers with a sampling of servers denoted as a server 1012 and a server 1014.

Client 1002 may communicate bi-directionally with local network 1006 via a communication channel 1016. Client 1004 may communicate bi-directionally with local network 1008 via a communication channel 1018. Local network 1006 may communicate bi-directionally with global network 1010 via a communication channel 1020. Local network 1008 may communicate bi-directionally with global network 1010 via a communication channel 1022. Global network 1010 may communicate bi-directionally with server 1012 and server 1014 via a communication channel 1024. Server 1012 and server 1014 may communicate bi-directionally with each other via communication channel 1024. Furthermore, clients 1002, 1004, local networks 1006, 1008, global network 1010 and servers 1012, 1014 may each communicate bi-directionally with each other.

In one embodiment, global network 1010 may operate as the Internet. It will be understood by those skilled in the art that communication system 1000 may take many different forms. Non-limiting examples of forms for communication system 1000 include local area networks (LANs), wide area networks (WANs), wired telephone networks, wireless networks, or any other network supporting data communication between respective entities.

Clients 1002 and 1004 may take many different forms. Non-limiting examples of clients 1002 and 1004 include personal computers, personal digital assistants (PDAs), cellular phones and smartphones.

Client 1002 includes a CPU 1026, a pointing device 1028, a keyboard 1030, a microphone 1032, a printer 1034, a memory 1036, a mass memory storage 1038, a GUI 1040, a video camera 1042, an input/output interface 1044, and a network interface 1046.

CPU 1026, pointing device 1028, keyboard 1030, microphone 1032, printer 1034, memory 1036, mass memory storage 1038, GUI 1040, video camera 1042, input/output interface 1044 and network interface 1046 may communicate in a unidirectional manner or a bi-directional manner with each other via a communication channel 1048. Communication channel 1048 may be configured as a single communication channel or a multiplicity of communication channels.

CPU 1026 may be comprised of a single processor or multiple processors. CPU 1026 may be of various types including micro-controllers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors.

As is well known in the art, memory 1036 is used typically to transfer data and instructions to CPU 1026 in a bi-directional manner. Memory 1036, as discussed previously, may include any suitable computer-readable media, intended for data storage, such as those described above excluding any wired or wireless transmissions unless specifically noted. Mass memory storage 1038 may also be coupled bi-directionally to CPU 1026 and provides additional data storage capacity and may include any of the computer-readable media described above. Mass memory storage 1038 may be used to store programs, data and the like and is typically a secondary storage medium such as a hard disk. It will be appreciated that the information retained within mass memory storage 1038, may, in appropriate cases, be incorporated in standard fashion as part of memory 1036 as virtual memory.

CPU 1026 may be coupled to GUI 1040. GUI 1040 enables a user to view the operation of computer operating system and software. CPU 1026 may be coupled to pointing device 1028. Non-limiting examples of pointing device 1028 include computer mouse, trackball and touchpad. Pointing device 1028 enables a user with the capability to maneuver a computer cursor about the viewing area of GUI 1040 and select areas or features in the viewing area of GUI 1040. CPU 1026 may be coupled to keyboard 1030. Keyboard 1030 enables a user with the capability to input alphanumeric textual information to CPU 1026. CPU 1026 may be coupled to microphone 1032. Microphone 1032 enables audio produced by a user to be recorded, processed and communicated by CPU 1026. CPU 1026 may be connected to printer 1034. Printer 1034 enables a user with the capability to print information to a sheet of paper. CPU 1026 may be connected to video camera 1042. Video camera 1042 enables video produced or captured by user to be recorded, processed and communicated by CPU 1026.

CPU 1026 may also be coupled to input/output interface 1044 that connects to one or more input/output devices such as such as CD-ROM, video monitors, track balls, mice, keyboards, microphones, touch-sensitive displays, transducer card readers, magnetic or paper tape readers, tablets, styluses, voice or handwriting recognizers, or other well-known input devices such as, of course, other computers.

Finally, CPU 1026 optionally may be coupled to network interface 1046 which enables communication with an external device such as a database or a computer or telecommunications or internet network using an external connection shown generally as communication channel 1016, which may be implemented as a hardwired or wireless communications link using suitable conventional technologies. With such a connection, CPU 1026 might receive information from the network, or might output information to a network in the course of performing the method steps described in the teachings of the present invention.

Figure 11:
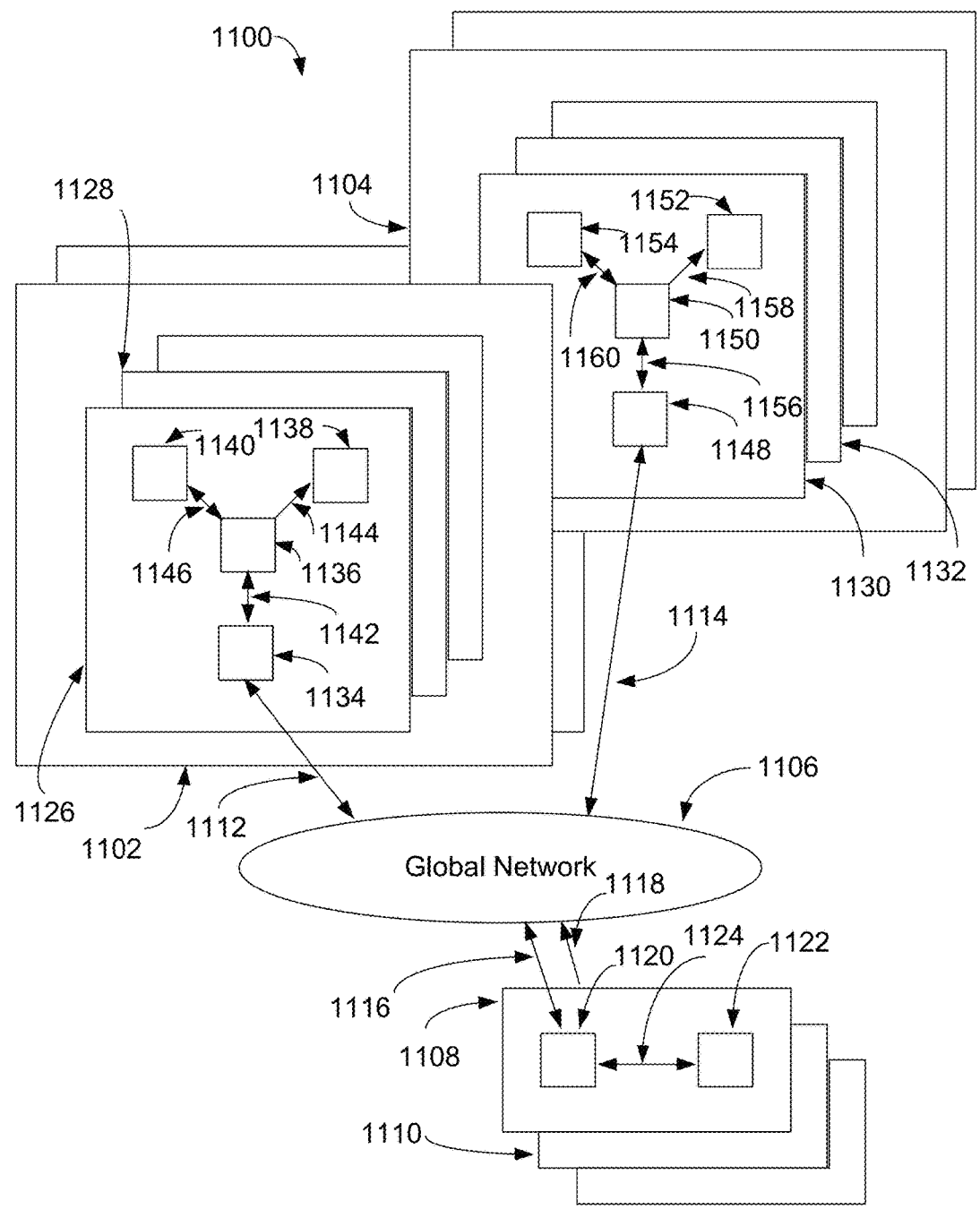
FIG. 11 illustrates a block diagram depicting a conventional client/server communication system.

FIG. 11 illustrates a block diagram depicting a conventional client/server communication system.

A communication system 1100 includes a multiplicity of networked regions with a sampling of regions denoted as a network region 1102 and a network region 1104, a global network 1106 and a multiplicity of servers with a sampling of servers denoted as a server device 1108 and a server device 1110.

Network region 1102 and network region 1104 may operate to represent a network contained within a geographical area or region. Non-limiting examples of representations for the geographical areas for the networked regions may include postal zip codes, telephone area codes, states, counties, cities and countries. Elements within network region 1102 and 1104 may operate to communicate with external elements within other networked regions or within elements contained within the same network region.

In some implementations, global network 1106 may operate as the Internet. It will be understood by those skilled in the art that communication system 1100 may take many different forms. Non-limiting examples of forms for communication system 1100 include local area networks (LANs), wide area networks (WANs), wired telephone networks, cellular telephone networks or any other network supporting data communication between respective entities via hardwired or wireless communication networks. Global network 1106 may operate to transfer information between the various networked elements.

Server device 1108 and server device 1110 may operate to execute software instructions, store information, support database operations and communicate with other networked elements. Non-limiting examples of software and scripting languages which may be executed on server device 1108 and server device 1110 include C, C++, C# and Java.

Network region 1102 may operate to communicate bi-directionally with global network 1106 via a communication channel 1112. Network region 1104 may operate to communicate bi-directionally with global network 1106 via a communication channel 1114. Server device 1108 may operate to communicate bi-directionally with global network 1106 via a communication channel 1116. Server device 1110 may operate to communicate bi-directionally with global network 1106 via a communication channel 1118. Network region 1102 and 1104, global network 1106 and server devices 1108 and 1110 may operate to communicate with each other and with every other networked device located within communication system 1100.

Server device 1108 includes a networking device 1120 and a server 1122. Networking device 1120 may operate to communicate bi-directionally with global network 1106 via communication channel 1116 and with server 1122 via a communication channel 1124. Server 1122 may operate to execute software instructions and store information.

Network region 1102 includes a multiplicity of clients with a sampling denoted as a client 1126 and a client 1128. Client 1126 includes a networking device 1134, a processor 1136, a GUI 1138 and an interface device 1140. Non-limiting examples of devices for GUI 1138 include monitors, televisions, cellular telephones, smartphones and PDAs (Personal Digital Assistants). Non-limiting examples of interface device 1140 include pointing device, mouse, trackball, scanner and printer. Networking device 1134 may communicate bi-directionally with global network 1106 via communication channel 1112 and with processor 1136 via a communication channel 1142. GUI 1138 may receive information from processor 1136 via a communication channel 1144 for presentation to a user for viewing. Interface device 1140 may operate to send control information to processor 1136 and to receive information from processor 1136 via a communication channel 1146. Network region 1104 includes a multiplicity of clients with a sampling denoted as a client 1130 and a client 1132. Client 1130 includes a networking device 1148, a processor 1150, a GUI 1152 and an interface device 1154. Non-limiting examples of devices for GUI 1138 include monitors, televisions, cellular telephones, smartphones and PDAs (Personal Digital Assistants). Non-limiting examples of interface device 1140 include pointing devices, mousse, trackballs, scanners and printers. Networking device 1148 may communicate bi-directionally with global network 1106 via communication channel 1114 and with processor 1150 via a communication channel 1156. GUI 1152 may receive information from processor 1150 via a communication channel 1158 for presentation to a user for viewing. Interface device 1154 may operate to send control information to processor 1150 and to receive information from processor 1150 via a communication channel 1160.

For example, consider the case where a user interfacing with client 1126 may want to execute a networked application. A user may enter the IP (Internet Protocol) address for the networked application using interface device 1140. The IP address information may be communicated to processor 1136 via communication channel 1146. Processor 1136 may then communicate the IP address information to networking device 1134 via communication channel 1142. Networking device 1134 may then communicate the IP address information to global network 1106 via communication channel 1112. Global network 1106 may then communicate the IP address information to networking device 1120 of server device 1108 via communication channel 1116. Networking device 1120 may then communicate the IP address information to server 1122 via communication channel 1124. Server 1122 may receive the IP address information and after processing the IP address information may communicate return information to networking device 1120 via communication channel 1124. Networking device 1120 may communicate the return information to global network 1106 via communication channel 1116. Global network 1106 may communicate the return information to networking device 1134 via communication channel 1112. Networking device 1134 may communicate the return information to processor 1136 via communication channel 1142. Processor 1146 may communicate the return information to GUI 1138 via communication channel 1144. User may then view the return information on GUI 1138.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC § 112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC § 112 (6). In some embodiments, the methods and/or system components which may be located and/or performed remotely include, without limitation databases or image storage.

It is noted that according to USA law, all claims must be set forth as a coherent, cooperating set of limitations that work in functional combination to achieve a useful result as a whole. Accordingly, for any claim having functional limitations interpreted under 35 USC § 112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC § 112 (6) is/(are) dependent on one or more remote servers located outside the USA, it is intended that each such recited function under 35 USC § 112 (6) is to be interpreted as the function of the local system receiving the remotely generated information required by a locally implemented claim limitation, wherein the structures and or steps which enable, and breathe life into the expression of such functions claimed under 35 USC § 112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC § 112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" claim limitation implies that the broadest initial search on 112(6) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112 (6) when such corresponding structures are not explicitly disclosed in the foregoing patent specification. Therefore, for any invention element(s)/structure(s) corresponding to functional claim limitation(s), in the below claims interpreted under 35 USC § 112 (6), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claims construction proceedings and/or examination of patent allowability properly identify and incorporate only the portions of each of these documents discovered during the broadest interpretation search of 35 USC § 112 (6) limitation, which exist in at least one of the patent and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112 (6), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing image-based status resolution services according to the present invention will be apparent to those skilled in the art. Various aspects of the invention have been described above by way of illustration, and the specific embodiments disclosed are not intended to limit the invention to the particular forms disclosed. The particular implementation of the image-based status resolution services may vary depending upon the particular context or application. By way of example, and not limitation, the image-based status resolution services described in the foregoing were principally directed to automated status detection implementations; however, similar techniques may instead be applied to automobile maintenance, circuit analysis, medical diagnoses, or robotics, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method comprising the steps of:
    capturing at least one image of an operation panel of at least one peripheral device, the operation panel comprising an operations display, the operations display at least comprising a graphical user interface of the at least one peripheral device and presenting status information associated with a status encountered by the at least one peripheral device, the status information including a graphical code image representing the status encountered by the at least one peripheral device;
    communicating the at least one image of the operation panel of the at least one peripheral device to at least one computing system and to a second computing system, the at least one computing system being at least configured for:
        processing the at least one image of the operation panel of the at least one peripheral device for extracting features of the operation panel of the at least one peripheral device, the features including the graphical code image;

determining a model of the at least one peripheral device based on the extracted features of the operation panel of the at least one peripheral device;

determining at least the status encountered by the at least one peripheral device based on the extracted features of the operation panel of the at least one peripheral device, the determining the at least the status encountered by the at least one peripheral device based on the extracted features of the operation panel of the at least one peripheral device including determining the at least the status encountered by the at least one peripheral device based on the graphical code image, the determining the at least the status encountered by the at least one peripheral device based on the graphical code image including decoding the graphical code image extracted from the at least one image of the operation panel of the at least one peripheral device; and creating a status resolution to the status encountered by the at least one peripheral device;

polling the at least one computing system and the second computing system for a response with the status resolution;

receiving the status resolution to the status encountered by the at least one peripheral device from the at least one computing system; and displaying at least the status resolution.

2. The method as recited in claim 1, further comprising the step of recapturing the at least one image of the operation panel of the at least one peripheral device.

3. The method as recited in claim 2, further comprising the step of communicating the at least one recaptured image of the operation panel of the at least one peripheral device to the at least one computing system.

4. The method as recited in claim 2, further comprising the step of communicating the at least one captured image of the operation panel of the at least one peripheral device to a maintenance working server device.

5. The method as recited in claim 1, further comprising the step of capturing an image of parts of the at least one peripheral device other than the operation panel of the at least one peripheral device.

6. The method as recited in claim 1, further comprising the step of capturing at least an image of an operation panel of a second peripheral device for communicating with the at least one image of the operation panel of the at least one peripheral device to the at least one computing system.

7. The method as recited in claim 1, in which the status resolution further comprises instruction for a user.

8. The method as recited in claim 1, further comprising the steps of:

generating a status report;

displaying one or more information items to be listed on the status report, the one or more information items associated with the status encountered by the at least one peripheral device;

receiving a selection of at least one of the one or more information items; and communicating the status report to the maintenance working server device.

9. The method as recited in claim 1, wherein the graphical code image is a QR code or a bar code.

10. A method comprising:

capturing at least one image of an operation panel of at least one peripheral device, the operation panel comprising an operations display, the operations display at least comprising a graphical user interface of the at least one peripheral device and presenting status information associated with a status encountered by the at least one peripheral device, the status information including a graphical code image representing the status encountered by the at least one peripheral device;

communicating the at least one image of the operation panel of the at least one peripheral device to at least one computing system and to a second computing system for processing the at least one image of the operation panel of the at least one peripheral device, for determining the status encountered by the at least one peripheral device by evaluating the at least one image of the operation panel of the at least one peripheral device, the evaluating the at least one image of the operation panel of the at least one peripheral device including evaluating the graphical code image, the evaluating the graphical code image including decoding the graphical code image extracted from the at least one image, and for creating a status resolution to the status encountered by the at least one peripheral device;

polling the at least one computing system and the second computing system for a response with status resolutions;

receiving the status resolution to the status encountered by the at least one peripheral device from the at least one computing system; and displaying at least the status resolution.

11. The method as recited in claim 10, further comprising steps for communicating the at least one captured image of the operation panel of the at least one peripheral device to a maintenance working server device.

12. The method as recited in claim 10, further comprising the step of recapturing the at least one image of the operation panel of the at least one peripheral device.

13. A non-transitory computer-readable storage medium with an executable program stored thereon, wherein the program instructs one or more processors to perform the following steps:

capturing at least one image of an operation panel of at least one peripheral device, the operation panel comprising an operations display, the operations display at least comprising a graphical user interface of the at least one peripheral device and presenting status information associated with a status encountered by the at least one peripheral device, the status information including a graphical code image representing the status encountered by the at least one peripheral device;

communicating the at least one image of the operation panel of the at least one peripheral device to at least one computing system and to a second computing system, the at least one computing system being at least configured for:

processing the at least one image of the operation panel of the at least one peripheral device for extracting features of the operation panel of the at least one peripheral device, the features including the graphical code image;

determining a model of the at least one peripheral device based on the extracted features of the operation panel of the at least one peripheral device;

determining at least the status encountered by the at least one peripheral device based on the extracted features of the operation panel of the at least one peripheral device, the determining the at least the status encountered by the at least one peripheral device based on the extracted features of the operation panel of the at least one peripheral device including determining the at least the status encountered by the at least one peripheral device based on the graphical code image, the determining the at least the status encountered by the at least one peripheral device based on the graphical code image including decoding the graphical code image extracted from the at least one image of the operation panel of the at least one peripheral device; and creating a status resolution to the status encountered by the at least one peripheral device;

polling the at least one computing system and the second computing system for a response with the status resolution;

receiving the status resolution to the status encountered by the at least one peripheral device from the at least one computing system; and displaying at least the status resolution.

14. The non-transitory computer-readable storage medium as recited in claim 13, wherein the program further instructs the one or more processors to perform the step of capturing at least an image of an operation panel of a second peripheral device for communicating with the at least one image of the operation panel of the at least one peripheral device to the at least one computing system.

\* \* \* \* \*